United States Patent
Delia et al.

(10) Patent No.: US 9,223,354 B2
(45) Date of Patent: Dec. 29, 2015

(54) GRID CONNECTED KEYBOARD APPARATUS

(71) Applicant: International Business Machines Corporation, Armonk, NY (US)

(72) Inventors: Wayne M. Delia, Poughkeepsie, NY (US); Mozhgan Eslami, Richmond Hill, CA (US); Gautam Majumdar, Wappingers Falls, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 99 days.

(21) Appl. No.: 14/079,136

(22) Filed: Nov. 13, 2013

(65) Prior Publication Data

US 2015/0131219 A1    May 14, 2015

(51) Int. Cl.
*G06F 1/16* (2006.01)

(52) U.S. Cl.
CPC .................................. *G06F 1/1669* (2013.01)

(58) Field of Classification Search
CPC ....................................................... G06F 1/1669
USPC ............................................. 361/679.17, 680
See application file for complete search history.

(56) References Cited

U.S. PATENT DOCUMENTS

| | | | | |
|---|---|---|---|---|
| 7,238,907 | B2 * | 7/2007 | Ito | H01H 3/125 200/344 |
| 8,283,581 | B2 | 10/2012 | Weng et al. | |
| 2002/0085337 | A1 * | 7/2002 | Rubenson | G06F 1/1616 361/679.09 |
| 2006/0081489 | A1 | 4/2006 | Wheeler et al. | |
| 2007/0199804 | A1 * | 8/2007 | Joseph et al. | 200/5 A |
| 2007/0199894 | A1 * | 8/2007 | Peyton | C02F 3/28 210/603 |
| 2013/0043115 | A1 | 2/2013 | Yang et al. | |

FOREIGN PATENT DOCUMENTS

| | | |
|---|---|---|
| CN | 101295191 A | 10/2008 |
| CN | 101364139 A | 2/2009 |
| EP | 1909301 A1 | 4/2008 |
| EP | 2442259 A1 | 4/2012 |

(Continued)

OTHER PUBLICATIONS

Resonna Shaw, "How to Clean Underneath a Laptop Keyboard" [online], [retrieved on May 16, 2013]. Retrieved from the Internet:<URL: http://www.ehow.com/how_6776436_clean-underneath-laptop-keyboard.html>, all pages.
"Disposable Cover for a Keyboard", IP.com No. IPCOM000004407D, IP.com Electronic Publication: Nov. 8, 2000, all pages.
"Clean a Dell Inspiron N7110 Keyboard", [online], Retrieved from the Internet<URL: http://laptopkeyboard.typepad.com/blog/dell-inspiron-keyboard/>, Oct. 7, 2012, all pages.

(Continued)

*Primary Examiner* — Tuan T Dinh
*Assistant Examiner* — Rockshana Chowdhury
(74) *Attorney, Agent, or Firm* — Law Offices of Ira D. Blecker, P.C.

(57) ABSTRACT

A grid connected keyboard which includes a keyboard base; and a removable keyboard positioned with respect to the keyboard base. The removable keyboard include a keyboard grid having a plurality of spaces; a plurality of keyboard keys positioned within the spaces of the keyboard grid; and fastening means between the keyboard grid and each of the plurality of keyboard keys for maintaining the keyboard keys within the spaces of the keyboard grid. The fastening means allows movement of the keyboard keys in a direction perpendicular to a plane that contains the keyboard grid. The removable keyboard, including the plurality of keyboard keys, are removable from the keyboard base as a unit.

20 Claims, 6 Drawing Sheets

(56) References Cited

FOREIGN PATENT DOCUMENTS

| EP | 2469557 A1 | 6/2012 |
|----|------------|--------|
| JP | 2005071716 A | 3/2005 |
| JP | 4313630 B2 | 8/2009 |
| WO | WO2012010713 A2 | 1/2012 |

OTHER PUBLICATIONS

Jane Williams, "My Keyboard Is Not Typing: Beeping & Sticky Keys", [Online]. [ Retrieved on May 16, 2013]. Retrieved from the Internet: <URL: http://www.ehow.com/info_12181644_keyboard-not-typing-beeping-sticky-keys.html>, all pages.

* cited by examiner

GRID CONNECTED KEYBOARD APPARATUS

BACKGROUND

The present invention relates to keyboards for computers and more particularly to keyboards that may be removable from the keyboard base while keeping the keys on the keyboard.

The operation of a standard-size keyboard, whether connected to a computer workstation or manufacturing tool, is inhibited by debris, dust, and dirt accumulating on and within the keyboard. These forms of contamination can delay or prevent keystrokes from the keyboard to the operating system, resulting in potential data errors. Typical keyboards are operated with independent keys, usually one key for a pair or more of available input characters that are activated by pressing the key alone or in combination with the shift key, alt key, or control key.

Traditional solutions to alleviate contamination involve wiping down the keyboard with a cleaning cloth and cleaning solution, which does not remove debris lodged underneath the keys. The remaining debris can be attacked with a common can of compressed air, but this technique often forces dirt further into inaccessible nooks of the keyboard, usually underneath the keys, and does not efficiently solve the problem. The individual keys may be removed for cleaning underneath the keys but individual removal of the keys is tedious, time-consuming, and often results in broken keys requiring replacement of the broken keys.

BRIEF SUMMARY

The various advantages and purposes of the exemplary embodiments as described above and hereafter are achieved by providing, according to a first aspect of the exemplary embodiments, a grid connected keyboard which includes a keyboard base; and a removable keyboard positioned with respect to the keyboard base. The removable keyboard includes a keyboard grid having a plurality of spaces; a plurality of keyboard keys positioned within the spaces of the keyboard grid; and fastening means between the keyboard grid and each of the plurality of keyboard keys for maintaining the keyboard keys within the spaces of the keyboard grid. The fastening means allows movement of the keyboard keys in a direction perpendicular to a plane that contains the keyboard grid. The removable keyboard, including the plurality of keyboard keys, is removable from the keyboard base as a unit.

According to a second aspect of the exemplary embodiments, there is provided a grid connected keyboard which includes a keyboard grid having a plurality of spaces; a plurality of keyboard keys positioned within the spaces of the keyboard grid; and fastening means between the keyboard grid and each of the plurality of keyboard keys for maintaining the keyboard keys within the spaces of the keyboard grid. The fastening means allows movement of the keyboard keys in a direction perpendicular to a plane that contains the keyboard grid. The removable keyboard, including the plurality of keyboard keys, is movable as a unit.

According to a third aspect of the exemplary embodiments, there is provided a computing apparatus which includes a display screen; and a grid connected keyboard. The grid connected keyboard includes a keyboard base; and a removable keyboard positioned with respect to the keyboard base. The removable keyboard includes a keyboard grid having a plurality of spaces; a plurality of keyboard keys positioned within the spaces of the keyboard grid; and fastening means between the keyboard grid and each of the plurality of keyboard keys for maintaining the keyboard keys within the spaces of the keyboard grid. The fastening means allows movement of the keyboard keys in a direction perpendicular to a plane that contains the keyboard grid. The removable keyboard, including the plurality of keyboard keys, is removable from the keyboard base as a unit.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

The exemplary embodiments pertain to a removable keyboard which uses a grid that permits normal operation of the keyboard, but also includes means which connect the keys to the grid for easy removal of the keyboard to facilitate a much improved, more efficient and expedient cleaning process. The removable keyboard is designed with specific alignment guides to enable reliable and accurate removal and replacement on the cleaned keyboard base.

Figure 1:
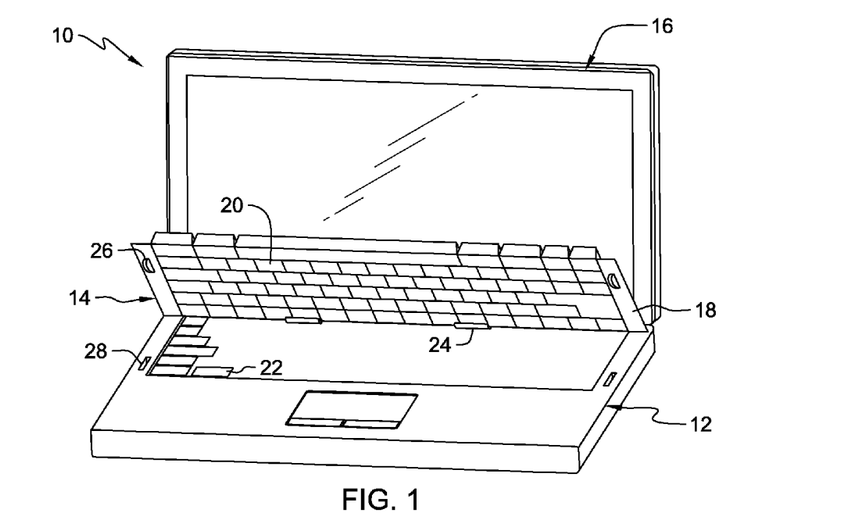
FIG. 1 is an illustration of a computing apparatus with a removable keyboard and FIG. 1A is a representation of an alignment mechanism to align the removable keyboard with the laptop.

Referring to the Figures in more detail, and particularly referring to FIG. 1, there is shown a computing apparatus 10 comprising a keyboard base 12, a removable keyboard 14 and a display screen 16. One particularly preferred exemplary embodiment of the computing apparatus 10 is a laptop.

The removable keyboard 14 includes a keyboard grid 18 having a plurality of spaces (not clearly shown in FIG. 1) and a plurality of keyboard keys 20 positioned within the spaces in the keyboard grid 18. The bottom of the removable keyboard 14 and the bottoms of the plurality of keyboard keys 20 are shown in FIG. 1.

The removable keyboard 14 is shown in FIG. 1 rotated away from the keyboard base 12 to illustrate that the removable keyboard 14 may be removable from the keyboard base 12 as a unit. Further shown in FIG. 1 are actuators 22 which when contacted by a downward motion of one of the keyboard keys 20, causes a keystroke to be displayed on the display screen 16. Only some of the actuators 22 are shown in FIG. 1 but it should be understood that there is usually one actuator per keyboard key 20. Importantly, the removable keyboard 14 may be moved from contact with the keyboard base 12 to expose the area underneath the removable keyboard 14 for cleaning and maintenance.

Figure 9:
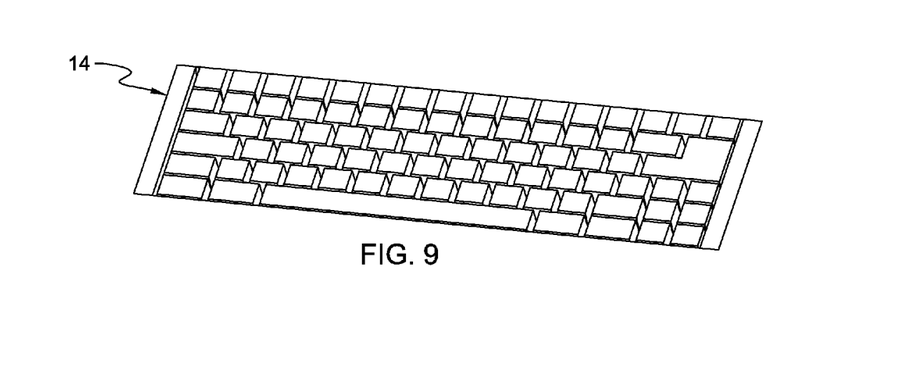
FIG. 9 is an illustration of the removable keyboard as a separate article of commerce.

The removable keyboard 14 may be connected to the keyboard base 12 by hinges 24 which allow the removable keyboard 14 to be rotated up from the keyboard base 12 while still being connected to it. It may be desirable to completely separate the removable keyboard 14 from the keyboard base 12 so hinges 24 may not be necessary. It should be understood that the "removable" in removable keyboard 14 means that the removable keyboard 14 may be separated from the keyboard base 12 which may be by rotating the removable keyboard 14 up from the keyboard base 12, as shown in FIG. 1, or by completely removing the removable keyboard from the computing apparatus 10 as shown in FIG. 9.

Figure 1A:
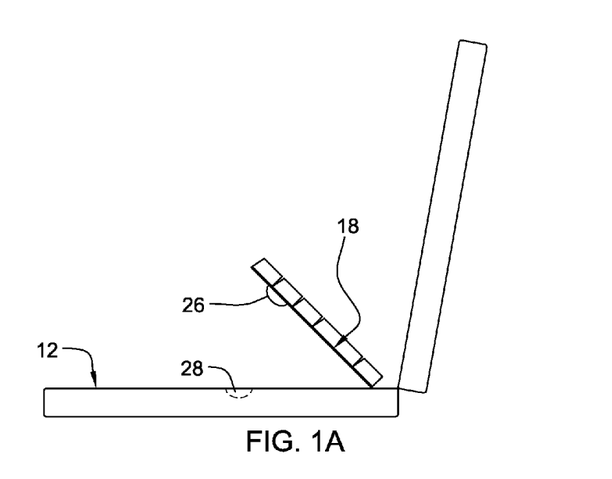

To help with aligning the removable keyboard 14 to the keyboard base 12, there may be projections 26 on the bottom of the keyboard grid 18 which may align with apertures 28 on the keyboard base 12 so that the removable keyboard 14 may be properly aligned with the keyboard base 12. An example of such alignment means is shown in FIG. 1A where a projection 26 on the keyboard grid 18 may align with aperture 28 on the keyboard base 12. In an alternative embodiment, the projections may be on the keyboard base 12 while the apertures may be on the bottom of the keyboard grid 18. In a further alternative embodiment, there may be the projections and apertures when there are hinges 24 present to assist in the alignment of the removable keyboard 14 and the keyboard base 12. In a yet further alternative embodiment, the projections and apertures may snap together to provide rigid engagement of the removable keyboard 14 and the keyboard base 12.

The removable keyboard 14 further includes fastening means (not shown in FIG. 1) on the keyboard grid 18 for maintaining the keyboard keys 20 within the spaces of the keyboard grid 18. The fastening means allows movement of the keyboard keys 20 in a direction perpendicular to a plane that contains the keyboard grid 18. That is, when a user presses down a keyboard key 20, the fastening means allows the keyboard key 20 to be depressed but still maintains the keyboard key 20 within the keyboard grid 18. As the keyboard keys 20 are maintained within the keyboard grid 18 by the fastening means, the removable keyboard 14, which includes the plurality of keyboard keys 20, may be removable from the keyboard base 12 as a unit, as shown in FIG. 1.

Figure 2:
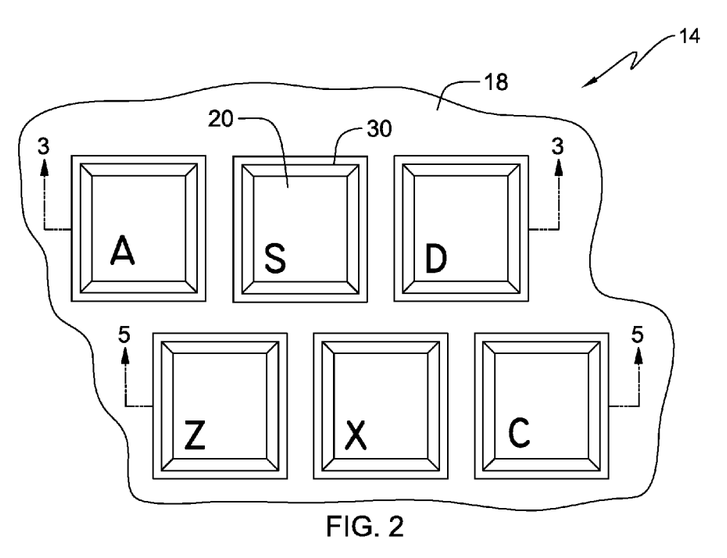
FIG. 2 is an enlarged plan view of a portion of the removable keyboard.

Referring now to FIG. 2, there is shown an enlarged plan view of a portion of the removable keyboard 14 shown in FIG. 1. The plurality of keyboard keys 20 are positioned in the keyboard grid 18. There is a gap 30 between the keyboard keys and keyboard grid 18 which allows for movement of the keyboard keys 20 with respect to the keyboard grid 18. Not shown in FIG. 2 are the fastening means which maintain the keyboard keys 20 within the keyboard grid 18.

Figure 3:
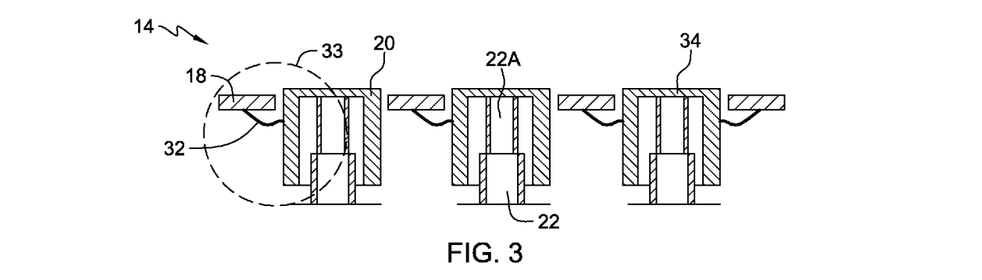
FIG. 3 is a cross sectional view of the removable keyboard of FIG. 2 in the direction of the arrows 3-3 in FIG. 2 illustrating a first exemplary embodiment of means for fastening the keys to the removable keyboard.

Referring now to FIG. 3, there is illustrated a cross sectional view of the removable keyboard of FIG. 2 in the direction of the arrows 3-3 in FIG. 2 illustrating a first exemplary embodiment of a means for fastening the keys to the removable keyboard. This exemplary embodiment of the fastening means may be an elastic material 32 which is connected between the keyboard grid 18 and the keyboard key 20. In one exemplary embodiment, the elastic material may be connected to only one side of the keyboard key 20 or as shown with respect to keyboard key 34, the elastic material may be connected to opposite sides of the keyboard key 34. Suitable materials for the elastic material may include natural and synthetic rubbers.

Further shown in FIG. 3 are the actuators 22 referred to in FIG. 1. Actuators 22 may be any apparatus that is capable of being depressed by a keyboard key and then returning to its normal (at rest) position when the keyboard key is no longer being depressed. As shown in FIG. 3, the actuators 22 may, for the purpose of illustration and not limitation, include a spring-loaded piston 22A which allows the keyboard key 20, 34 to be depressed by a user and then returns the keyboard key 20, 34 to its normal (at rest) position when the user is no longer depressing the keyboard key 20, 34.

Figure 4:
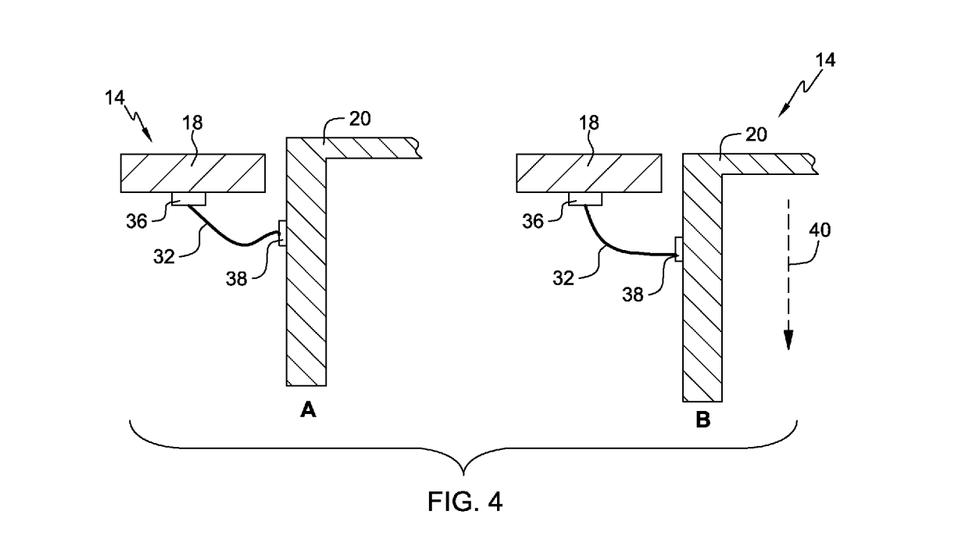
FIG. 4 is an enlarged view of the fastening means of FIG. 3.

FIGS. 4A and 4B are enlarged views of a portion of the removable keyboard 14 enclosed within circle 33 in FIG. 3. Actuator 22 is not shown for clarity. The elastic material 32 may be adhered to the keyboard grid 18 by, for example, epoxy 36, and may be adhered to the keyboard key 20 by, for example, epoxy 38. Other adhesives may also be used. FIG. 4A illustrates the keyboard key 20 in its normal (at rest), undepressed state. When the keyboard key is pressed downwardly, as indicated by arrow 40 in FIG. 4B, the elastic material 32 may stretch to allow the downward movement of the keyboard key 20. When downward pressure is removed from the keyboard key 20, the actuator 22 pushes the keyboard key 20 back to its rest position as shown in FIG. 4A. The elastic material 32 may also contribute to the keyboard key 20 returning to its rest position. The elastic material 32 should be sufficiently elastic to allow the depressing of the keyboard key 20 while ensuring that the keyboard key 20 is retained within the keyboard grid 18.

Figure 5:
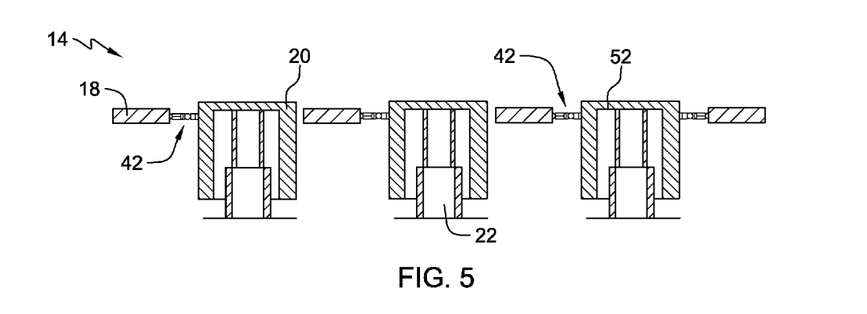
FIG. 5 is a cross sectional view of the removable keyboard of FIG. 2 in the direction of the arrows 5-5 in FIG. 2 illustrating further exemplary embodiments of means for fastening the keys to the removable keyboard.

FIG. 5 is a cross sectional view of the removable keyboard of FIG. 2 in the direction of the arrows 5-5 in FIG. 2 illustrating additional embodiments of means for fastening 42 the keyboard keys to the removable keyboard. There are several forms that these additional embodiments may take.

One exemplary embodiment of the means for fastening 42 may be a hinged apparatus 43 which is connected between the keyboard grid 18 and the keyboard key 20. In one exemplary embodiment, the hinged apparatus 43 may be connected to only one side of the keyboard key or as shown with respect to keyboard key 52, the hinged apparatus 43 may be connected to opposite sides of the keyboard key 52.

Figure 6:
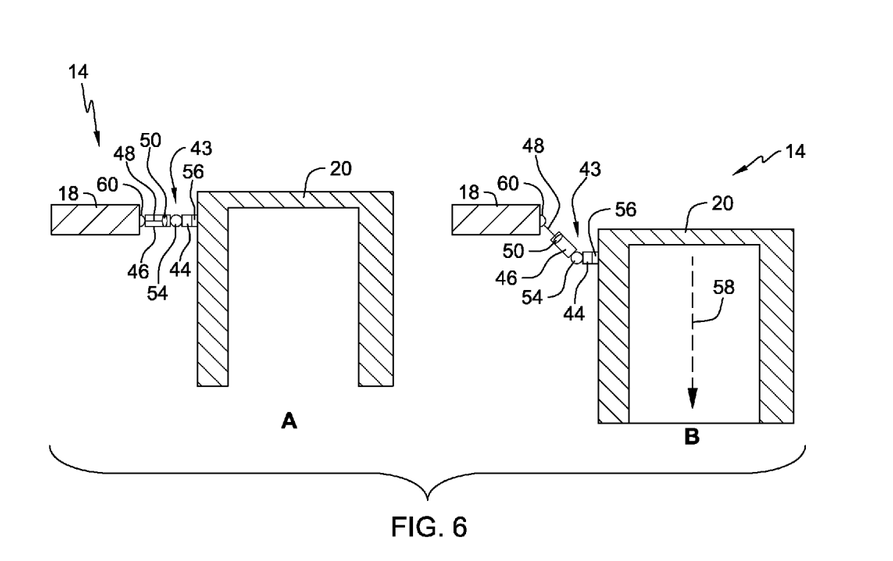
FIG. 6 is an enlarged view of one exemplary embodiment of the fastening means of FIG. 5.

FIGS. 6A and 6B are enlarged views of a portion of the removable keyboard 14 showing a portion of the keyboard grid 18, keyboard key 20 and hinged apparatus 43. Actuator 22 is not shown for clarity. The hinged apparatus 43 may include a simple hinge between the keyboard grid 18 and keyboard key 20. In one exemplary preferred embodiment of the hinged apparatus 43, the hinged apparatus 43 may include two parts 44, 46 that are rotatable about a hinged joint 54. One part 44 of the hinged apparatus 43 may be attached to the keyboard key 20 by, for example, an adhesive 56 such as epoxy. The other part 46 of the hinged apparatus 43 may consist of a hollow tube 46 with a movable rod 48 contained within the hollow tube 46. The movable rod 48 may have a larger diameter knob 50 on one end to keep the movable rod 48 from moving out from the hollow tube 46. The other end of the movable rod 48 may be connected to the keyboard grid 18 by a smaller hinged joint 60. FIG. 6A illustrates the keyboard key 20 in its normal, undepressed state. When the keyboard key is pressed downwardly, as indicated by arrow 58, the hinged apparatus 43 bends at hinged joint 54 and smaller hinged joint 60 and movable rod 48 extends outwardly from the hollow tube 46. The movable rod 48 is desirable because as the keyboard key 20 is pressed downwardly, the hinged apparatus 43 must extend to accommodate the downward movement of the keyboard key 20. When downward pressure is removed from the keyboard key 20, the actuator 22 (shown in FIG. 5) pushes the keyboard key 20 back to its rest position as shown in FIG. 4A.

It should be understood that the hinged apparatus 43 may be reversed so that the hinged part 44 is attached to the keyboard grid 18 and movable rod 48 may be connected to keyboard key 20 by smaller hinged joint 60.

Figure 7:
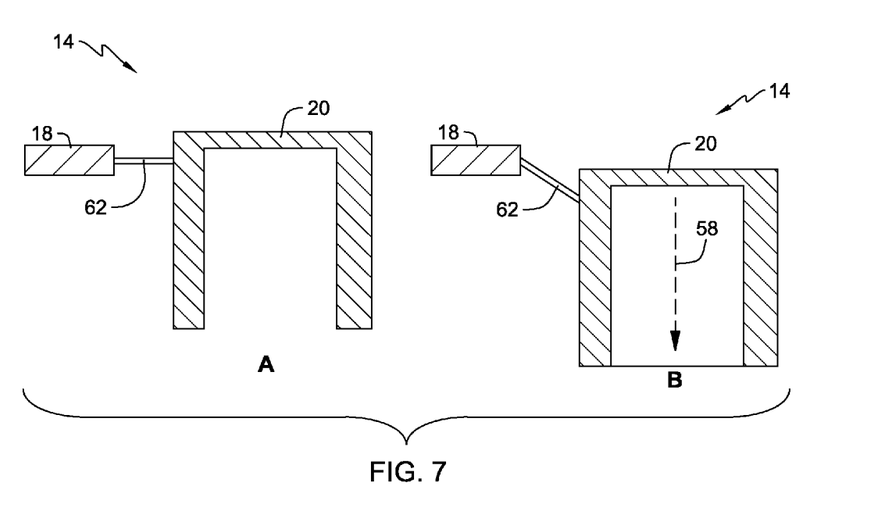
FIG. 7 is an enlarged view of another exemplary embodiment of the fastening means of FIG. 5.

Other means for fastening 42 are shown in FIG. 7. In one embodiment, keyboard key 20 may be connected to keyboard grid 18 by connector material 62. In one embodiment, the keyboard grid 18, keyboard key 20 and connector material 62 may be molded together and all be of the same material. In this respect, it may be said that the connector material 62 is integral with the keyboard grid 18 and the connector material 62 is also integral with each of the keyboard keys 20. For example, the keyboard grid 18, keyboard key 20 and connector material 62 may be molded together of polyethylene or polypropylene so that the connector material 62 essentially forms a "living hinge". As the keyboard key 20 is depressed, as indicated by arrow 58 in FIG. 7B, the "living hinge" allows the keyboard key 20 to be depressed while maintaining the keyboard board key 20 in position with respect to the keyboard grid 18. When pressure is removed from the keyboard key 20, the actuator 22 (shown in FIG. 5) may return the keyboard key to its rest position as shown in FIG. 7A.

In general, the connector material 62 may be any material that is capable of elastically deforming. That is, the connector material 62 may be capable of deforming or bending downwardly, as shown in FIG. 7B, and then returning to its undeformed condition as shown in FIG. 7A. Thus, the connector material 62 may be an elastic material such as natural or synthetic rubber, a polymeric material such as polyethylene or polypropylene or a metal that has been treated to behave like a spring.

Further, while the living hinge described above may be formed when the keyboard grid 18, connector material 62 and keyboard key 20 are molded together, the connector material may be added to the keyboard grid 18 and keyboard keys 20 during assembly of the removable keyboard 14 by adhering the connector material to the keyboard grid 18 and keyboard 14 similar to that shown in FIGS. 3, 4A and 4B.

Figure 8:
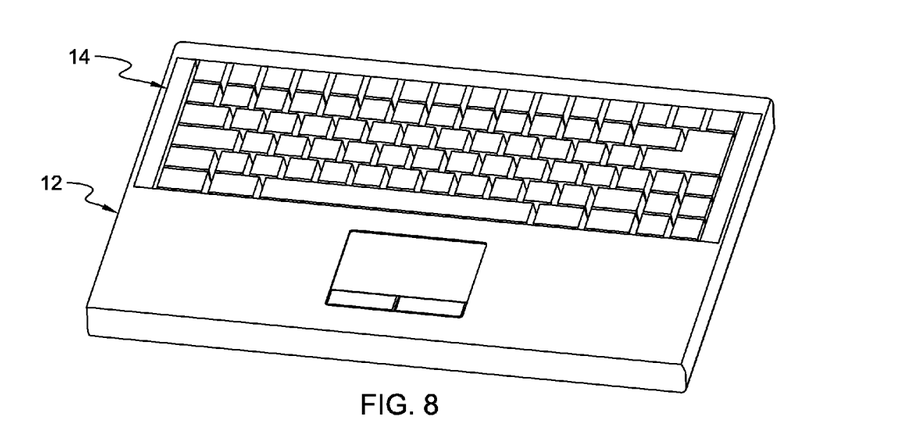
FIG. 8 is an illustration of the removable keyboard with a keyboard base.

Referring now to FIG. 8, there is illustrated the removable keyboard 14 with just the keyboard base 12. Such an embodiment may be useful as a standalone keyboard apparatus that may be wirelessly connected or wired, for example, to a monitor such as might be the case for a personal computer or workstation or even a laptop.

Referring now to FIG. 9, there is illustrated just the removable keyboard 14 as a separate article of commerce. The removable keyboard 14 may be used with any keyboard base that is able to accommodate the removable keyboard 14. The removable keyboard 14 may be used with any of the embodiments previously discussed.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A grid connected keyboard comprising:
   a keyboard base; and
   a removable keyboard positioned with respect to the keyboard base, the removable keyboard comprising:
     a keyboard grid having a plurality of spaces;
     a plurality of keyboard keys positioned within the spaces of the keyboard grid; and
     fastening means between the keyboard grid and each of the plurality of keyboard keys for maintaining the keyboard keys within the spaces of the keyboard grid, the fastening means being permanently fastened to the keyboard grid and each of the keyboard keys while allowing movement of the keyboard keys in a direction perpendicular to a plane that contains the keyboard grid;
   the removable keyboard, including the plurality of keyboard keys, being removable from the keyboard base as a unit.

2. The grid connected keyboard of claim 1 further comprising alignment openings on one of the removable keyboard and the keyboard base and alignment projections on the other of the removable keyboard and the keyboard base such that when the alignment projections are inserted into the alignment openings, the keyboard base and the removable keyboard are aligned.

3. The grid connected keyboard of claim 1 wherein the removable keyboard is hinged to the keyboard base so that the removable keyboard may be rotated away from the keyboard base.

4. The grid connected keyboard of claim 1 wherein the keyboard grid, the fastening means and the plurality of keyboard keys have been formed as a single molded unit such that the fastening means is integral with the keyboard grid and each of the plurality of keyboard keys.

5. The grid connected keyboard of claim 1 wherein the fastening means comprises a material selected from the group consisting of an elastic material, a spring metal, polyethylene or polypropylene, the fastening means having a first portion connected to the keyboard grid and a second portion connected to one of the keyboard keys.

6. The grid connected keyboard of claim 5 wherein the fastening means connects a first side of the one of the keyboard keys to the keyboard grid and a second side of the one of the keyboard keys to the keyboard grid.

7. The grid connected keyboard of claim 1 wherein the fastening means comprises a hinge having a first portion connected to the keyboard grid and a second portion connected to one of the keyboard keys.

8. The grid connected keyboard of claim 7 wherein the fastening means connects a first side of the one of the keyboard keys to the keyboard grid and a second side of the one of the keyboard keys to the keyboard grid.

9. The grid connected keyboard of claim 7 wherein the first portion of the hinge comprises a hollow tube and a rod slidably inserted into the hollow tube such that an end of the rod is attached to the keyboard grid wherein the rod moves out of the hollow tube with a downward movement of the one of the keyboard keys and the rod moves into the hollow tube with a subsequent upward movement of the one of the keyboard keys.

10. A grid connected keyboard comprising:
    a keyboard grid having a plurality of spaces;
    a plurality of keyboard keys positioned within the spaces of the keyboard grid; and
    fastening means between the keyboard grid and each of the plurality of keyboard keys for maintaining the keyboard keys within the spaces of the keyboard grid, the fastening means being permanently fastened to the keyboard grid and each of the keyboard keys while allowing movement of the keyboard keys in a direction perpendicular to a plane that contains the keyboard grid;

the removable keyboard, including the plurality of keyboard keys, being movable as a unit.

11. The grid connected keyboard of claim 10 wherein the fastening means comprises a material selected from the group consisting of an elastic material, a spring metal, polyethylene or polypropylene, the fastening means having a first portion connected to the keyboard grid and a second portion connected to one of the keyboard keys.

12. The grid connected keyboard of claim 11 wherein the fastening means connects a first side of the one of the keyboard keys to the keyboard grid and a second side of the one of the keyboard keys to the keyboard grid.

13. The grid connected keyboard of claim 10 wherein the fastening means comprises a hinge having a first portion connected to the keyboard grid and a second portion connected to one of the keyboard keys.

14. The grid connected keyboard of claim 13 wherein the fastening means connects a first side of the one of the keyboard keys to the keyboard grid and a second side of the one of the keyboard keys to the keyboard grid.

15. The grid connected keyboard of claim 13 wherein the first portion of the hinge comprises a hollow tube and a rod slidably inserted into the hollow tube such that an end of the rod is attached to the keyboard grid wherein the rod moves out of the hollow tube with a downward movement of the one of the keyboard keys and the rod moves into the hollow tube with a subsequent upward movement of the one of the keyboard keys.

16. A computing apparatus comprising:
a display screen; and
a grid connected keyboard comprising:
 a keyboard base; and
 a removable keyboard positioned with respect to the keyboard base, the removable keyboard comprising:
  a keyboard grid having a plurality of spaces;
  a plurality of keyboard keys positioned within the spaces of the keyboard grid; and
  fastening means between the keyboard grid and each of the plurality of keyboard keys for maintaining the keyboard keys within the spaces of the keyboard grid, the fastening means being permanently fastened to the keyboard grid and each of the keyboard keys while allowing movement of the keyboard keys in a direction perpendicular to a plane that contains the keyboard grid;
 the removable keyboard, including the plurality of keyboard keys, being removable from the keyboard base as a unit.

17. The computing apparatus of claim 16 wherein the display screen and the grid connected keyboard are mechanically and electrically connected to form a laptop.

18. The computing apparatus of claim 16 wherein the display screen is not mechanically connected to the grid connected keyboard.

19. The computing apparatus of claim 16 wherein the fastening means comprises a material selected from the group consisting of an elastic material, a spring metal, polyethylene or polypropylene, the fastening means having a first portion connected to the keyboard grid and a second portion connected to one of the keyboard keys.

20. The computing apparatus of claim 16 wherein the fastening means comprises a hinge having a first portion connected to the keyboard grid and a second portion connected to one of the keyboard keys.

* * * * *